(12) United States Patent
Kawasetsu et al.

(10) Patent No.: US 8,820,361 B2
(45) Date of Patent: Sep. 2, 2014

(54) TUBE BODY FOR PRESSURE TRANSDUCER

(75) Inventors: Nozomu Kawasetsu, Nagasaki (JP); Yoshinori Nonaka, Nagasaki (JP); Kenji Tanaka, Nagasaki (JP); Takayoshi Hori, Nagasaki (JP); Kiichi Tokunaga, Nagasaki (JP); Hidemi Sawada, Tokyo (JP); Hiroshi Tanaka, Joetsu (JP); Yuichi Kawai, Joetsu (JP); Takahiro Iiyoshi, Joetsu (JP)

(73) Assignees: Mitsubishi Heavy Industries, Ltd., Tokyo (JP); Arisawa Mfg., Ltd., Niigata (JP)

(*) Notice: Subject to any disclaimer, the term of this patent is extended or adjusted under 35 U.S.C. 154(b) by 436 days.

(21) Appl. No.: 13/265,908

(22) PCT Filed: Feb. 26, 2010

(86) PCT No.: PCT/JP2010/053137
§ 371 (c)(1),
(2), (4) Date: Dec. 7, 2011

(87) PCT Pub. No.: WO2010/125849
PCT Pub. Date: Nov. 4, 2010

(65) Prior Publication Data
US 2012/0090718 A1 Apr. 19, 2012

(30) Foreign Application Priority Data
Apr. 30, 2009 (JP) .............................. 2009-111430

(51) Int. Cl.
*F16L 55/04* (2006.01)

(52) U.S. Cl.
USPC ............... 138/31; 138/30; 138/109; 138/129; 138/172

(58) Field of Classification Search
USPC ...................... 138/31, 109, 172, 129, 130, 30
See application file for complete search history.

(56) References Cited

U.S. PATENT DOCUMENTS

| 4,714,094 A * | 12/1987 | Tovagliaro ..................... 138/31 |
| 5,236,018 A | 8/1993 | Kobayashi et al. |
| 7,108,016 B2 * | 9/2006 | Moskalik et al. ............... 138/31 |
| 7,208,207 B2 * | 4/2007 | Ono et al. .................... 428/34.1 |

(Continued)

FOREIGN PATENT DOCUMENTS

| JP | 02-078533 A | 3/1990 |
| JP | 07-266446 A | 10/1995 |

(Continued)

OTHER PUBLICATIONS

International Search Report of PCT/JP2010/053137 dated May 11, 2010.

(Continued)

*Primary Examiner* — Patrick F Brinson
(74) *Attorney, Agent, or Firm* — Sughrue Mion, PLLC

(57) ABSTRACT

A highly practical tube body for a pressure transducer is provided which has excellent pressure resistance, corrosion resistance, and tensile strength; which can be manufactured at low cost in comparison with cases of using stainless steel; and which makes it possible to keep inside diameter precision high. In this tube body for a pressure transducer, the pressure applied to the interior is varied periodically, and a seal layer (2) is provided to the internal peripheral surface of a tube body (1) made of a fiber-reinforced resin composed of fibers wound in layers.

9 Claims, 7 Drawing Sheets

(56) References Cited

U.S. PATENT DOCUMENTS

| | | | |
|---|---|---|---|
| 7,984,731 B2* | 7/2011 | Rajabi et al. | 138/31 |
| 2003/0111473 A1* | 6/2003 | Carter et al. | 220/586 |
| 2005/0166978 A1 | 8/2005 | Brueckmann et al. | |

FOREIGN PATENT DOCUMENTS

| | | |
|---|---|---|
| JP | 11-159619 A | 6/1999 |
| JP | 2000-346269 A | 12/2000 |
| JP | 2005-177753 A | 7/2005 |

OTHER PUBLICATIONS

Japanese Office Action of JP 2009-111430 dated May 6, 2010.
Japanese Office Action of JP 2009-111430 dated Jan. 13, 2011.
English Translation of International Preliminary Report on Patentability for PCT/JP2010/053137, issued on Dec. 12, 2011.

* cited by examiner

TUBE BODY FOR PRESSURE TRANSDUCER

CROSS REFERENCE TO RELATED APPLICATIONS

This application is a National Stage of International Application No. PCT/JP2010/053137 filed Feb. 26, 2010, claiming priority based on Japanese Patent Application No. 2009-111430, filed Apr. 30, 2009, the contents of all of which are incorporated herein by reference in their entirety.

TECHNICAL FIELD

The present invention relates to a tube body for a pressure transducer.

BACKGROUND ART

As disclosed in Patent Document 1, for example, there is known a pressure transducer in which the residual pressure of concentrated seawater (brine) flowing out from a seawater desalination apparatus equipped with a reverse osmosis membrane is recovered and used as some of the supply pressure, thereby raising the seawater power recovery efficiency from the conventional range between 80% and 90% to 90% or greater.

The pressure transducer disclosed in Patent Document 1 is a two-chamber pressure transducer composed of cylindrical tube chambers 53, 54, etc. containing respective pistons 55, 56, and a switching valve 58 provided to a seawater desalination apparatus in which seawater led in from a high-pressure pump 51 is fed to a reverse osmosis module 52, and water that permeates a reverse osmosis membrane inside the reverse osmosis module 52 is extracted as a permeate liquid (fresh water), as shown in FIG. 1. In FIG. 1, the symbol 57 indicates a control and adjustment unit for appropriately controlling and adjusting the pistons 55, 56, the switching valve 58, and other components, and 60 indicates a non-return valve.

Specifically, in FIG. 1, the seawater is fed not only to the reverse osmosis module 52 but also to the left side of the piston 56 of the tube chamber 54 and collected in the tube chamber 54 while pushing on the right side of the piston 56, and concentrated seawater on the right side of the piston 56 of the tube chamber 54, having already transmitted pressure and decreased in pressure, is therefore pushed by the piston 56 and discharged out via a valve 61. Concentrated seawater that has not permeated the reverse osmosis membrane of the reverse osmosis module 52 and that has high residual pressure is fed to the right side of the piston 55 of the tube chamber 53 and collected in the tube chamber 53 while pushing on the left side of the piston 55, and the residual pressure of this concentrated seawater is used to push the seawater collected on the left side of the piston 55 and feed this seawater to the reverse osmosis module 52 together with the seawater fed from the high-pressure pump 51 via a booster pump 59 (when the pistons 55, 56 thereafter reach their respective end edges, the switching valve 58 switches and the role of the tube chambers 53, 54 switches). Other systems of pressure transducers include those which use the difference in osmotic pressure between the concentrated seawater and the seawater to pressure-feed the seawater without pistons.

The tube chambers (tube bodies) to which the seawater and concentrated seawater are led in this pressure transducer are periodically and repeatedly subjected to high pressure (60 to 70 kg/cm$^2$) and brought in contact with seawater and concentrated seawater, and these tube chambers therefore require extremely high pressure resistance and corrosion resistance.

Therefore, 254 SMO or another super stainless steel, or A890-5A or another two-phase stainless steel, for example, having a PREN (Pitting Resistance Equivalent Number (PREN=Cr+3.3×Mo+16×N [%])) of 38 or greater is used for the tube chambers of the pressure transducer, the corrosion resistance is increased with stainless steel having a PREN of 38 or greater, and the tube chambers are designed and made with greater thickness, thereby ensuring pressure resistance.

However, since stainless steel having a PREN of 38 or greater contains much chrome, molybdenum, and nickel, not only is it costly (the prices of chrome, molybdenum, and nickel are often unstable because they are market transactions), but the inside diameter precision of the tube chambers does not improve beyond ±2 mm at a length of 7500 mm and an inside diameter ø of 355, for example, because more heat is applied when the stainless steel is extrusion molded or cast. With this low inside diameter precision, when the seawater collected in the tube chambers is supplied by the pressure of the concentrated seawater, gaps are formed between the tube chambers and the pistons, and the seawater supply efficiency is reduced.

Furthermore, when the material of the tube chambers is stainless steel, the material is affected by the temperature and the elongation in the length direction when pressure is applied (the tube chambers cause elongating deformation at the application of pressure when the temperature is high, e.g., approximately 50° C.), and the pressure deformation must therefore be taken into consideration.

PRIOR ART DOCUMENTS

Patent Documents

[Patent Document 1] JP-A No. 2005-177753

DISCLOSURE OF THE INVENTION

Problems the Invention is Intended to Solve

The present invention was designed in view of the circumstances described above, and the present invention therefore provides a highly practical tube body for a pressure transducer which has excellent pressure resistance, corrosion resistance, and tensile strength; which can be manufactured at low cost in comparison with cases of using stainless steel; and which makes it possible to keep inside diameter precision high.

Means for Solving Problems

A summary of the present invention is described with reference to the accompanying drawings.

A first aspect of the invention relates to a tube body for a pressure transducer provided to a seawater desalination apparatus, in which pressure applied to the interior is varied periodically, the tube body for a pressure transducer characterized in that the tube body has a piston in an interior; the tube body has a tube main body 1 made of a fiber-reinforced resin formed by winding continuous fibers into layers by filament winding and a seal layer 2 made of a fiber-reinforced resin 0.5 mm or more in thickness formed by tape winding in the interior of the tube main body 1 so that an internal peripheral surface is smooth and substantially uniform in diameter; the tube main body 1 contains the continuous fibers wound at an angle of 50°±5° relative to an axial core direction of the tube main body 1; the tube body is provided with a closed lid 7 which is provided securely to an end surface of the tube body, which closes up the end of the tube body, and which has an opening; and another tube member 11 communicated with the opening is joined by a bolt 10 to the closed lid 7.

A second aspect of the invention relates to a tube body for a pressure transducer provided to a seawater desalination apparatus in which pressure applied to the interior is varied periodically, the tube body for a pressure transducer characterized in that the tube body has a piston in an interior; the tube body has a tube main body 1 made of a fiber-reinforced resin formed by winding continuous fibers into layers by filament winding and a seal layer 2 made of a fiber-reinforced resin 0.5 mm or more in thickness formed by tape winding in the interior of the tube main body 1 so that an internal peripheral surface is smooth and substantially uniform in diameter; the tube main body 1 contains the continuous fibers wound at an angle of 50°±5° relative to the axial core direction of the tube main body 1; the tube body is provided with a closed lid 7 which is joined by a bolt 21 to a retaining ring 24 placed in a concavity 26 provided to the internal peripheral surface of the tube body, which closes up an end of the tube body, and which has an opening; a flange 12 of another tube member 11 communicated with the opening is placed between the closed lid 7 and the retaining ring 24; and the flange 12 is firmly joined between the closed lid 7 and the retaining ring 24 by the bolt 21.

A third aspect of the invention relates to the tube body for a pressure transducer according to the first aspect, characterized in that a peripheral surface of the tube body is provided with an inlet/outlet for leading in or leading out fluid from the peripheral surface, and the inlet/outlet is provided with a joining mechanism for joining the tube body and another member.

A fourth aspect of the invention relates to the tube body for a pressure transducer according to the second aspect, characterized in that a peripheral surface of the tube body is provided with an inlet/outlet for leading in or leading out fluid from the peripheral surface, and the inlet/outlet is provided with a joining mechanism for joining the tube body and another member.

A fifth aspect of the invention relates to the tube body for a pressure transducer according to the third aspect, the fiber-reinforced resinous tube body characterized in that the inlet/outlet has an in/out hole 29 drilled into the peripheral surface of the tube body and a cylinder body 31 provided to the in/out hole 29 and having a ridge 30 at one end, wherein between the ridge 30 of the cylinder body 31 and the internal peripheral surface of the tube body 1, a spacer 37 is provided having a top surface shape conforming along the curved shape of the internal peripheral surface.

A sixth aspect of the invention relates to the tube body for a pressure transducer according to the fourth aspect, the fiber-reinforced resinous tube body characterized in that the inlet/outlet has an in/out hole 29 drilled into the peripheral surface of the tube body and a cylinder body 31 provided to the in/out hole 29 and having a ridge 30 at one end, wherein between the ridge 30 of the cylinder body 31 and the internal peripheral surface of the tube body 1, a spacer 37 is provided having a top surface shape conforming along the curved shape of the internal peripheral surface.

A seventh aspect of the invention relates to the tube body for a pressure transducer according to any of the first through sixth aspects, characterized in that the bursting strength of the tube body is 60 to 105 kg/cm$^2$.

An eighth aspect of the invention relates to the tube body for a pressure transducer according to any of the first through sixth aspects, characterized in that when a pressure of 6.9 MPa is repeatedly applied 100,000 times to the interior while both ends are closed up, the difference in the amount of lengthwise elongation before and after pressure application is 0.02 mm in a tube length of 7500 mm.

A ninth aspect of the invention relates to the tube body for a pressure transducer according to the eighth aspect, characterized in that when a pressure of 6.9 MPa is repeatedly applied 100,000 times to the interior while both ends are closed up, the difference in the amount of lengthwise elongation before and after pressure application is 0.02 mm in a tube length of 7500 mm.

Effect of the Invention

The present invention, due to a configuration such as the one described above, is a highly practical tube body for a pressure transducer which has excellent pressure resistance, corrosion resistance, and tensile strength; which can be manufactured at low cost in comparison with cases of using stainless steel; and which makes it possible to keep inside diameter precision high.

BEST MODE FOR CARRYING OUT THE INVENTION

Preferred embodiments of the present invention are briefly described with reference to the diagrams while indicating the effects of the present invention.

The present invention is a tube body made of a fiber-reinforced resin composed of fibers wound in layers and is configured with a seal layer 2 provided to the inside surface, and therefore has excellent pressure resistance, corrosion resistance, and tensile strength, and can be manufactured at low cost compared with stainless steel.

Therefore, the present invention can be used in a stable manner for a long period of time and has excellent cost properties even when used in a pressure transducer requiring extremely high pressure resistance, corrosion resistance, and tensile strength.

Furthermore, due to the tube body being formed, for example, by filament winding or tape winding, the strain during cured molding of the resin is much less than the strain during molding of a stainless steel tube body (during extrusion molding or casting of stainless steel), the inside diameter precision is therefore improved over (made higher than) that of a stainless steel tube body, the gap between the piston and the inside wall of the tube body can be made as small as possible when a piston is provided in the tube body, for example, and more efficient pressure transmission is made possible.

The configuration elongates less readily under the applied pressure than in a stainless steel tube body, the lengthwise elongation is not readily affected by temperature, the configuration has even better dimension stability, and the configuration can be used satisfactorily even in high temperatures, such as in warm seawater near the equator.

In cases in which, for example, the tube main body 1 is formed by winding continuous fiber at an angle of 50°±5° relative to the axial core direction of the tube main body 1, or the tube main body 1 is configured from a layer made by winding continuous fiber at an angle of 45°±5° relative to the axial core direction of the tube main body 1 and a layer made by winding the fiber at an angle of 85°±5°, the tensile strength is improved even further, and the tube body can be used satisfactorily without the risk of rupturing or the like over a long period of time even when repeatedly affected by continual stress.

EXAMPLES

Specific examples of the present invention are described based on the drawings.

Figure 1:
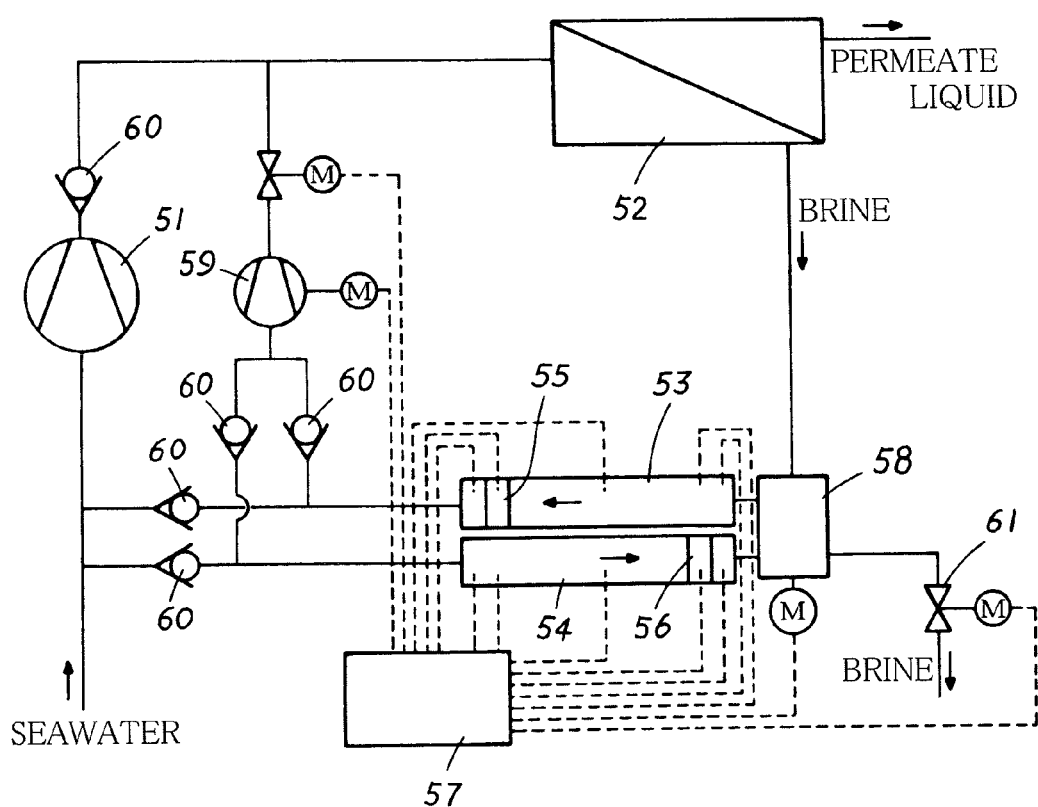
FIG. 1 is a schematic explanatory drawing of a pressure transducer.
Figure 2:
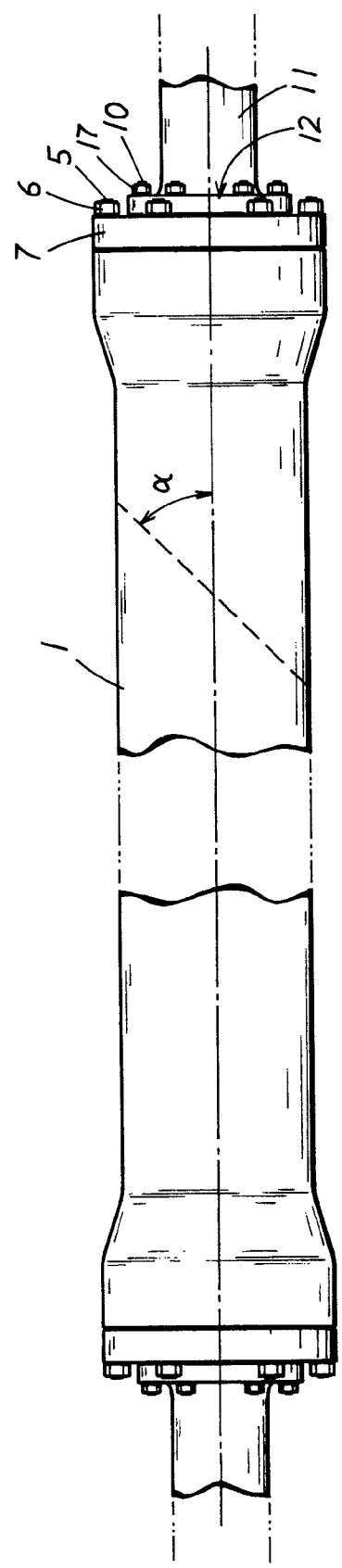
FIG. 2 is a schematic explanatory side view of the present example.

The present example is a tube body for a pressure transducer provided to a seawater desalination apparatus such as is shown in FIG. 1, wherein the pressure applied to the interior is periodically varied, the tube body being composed of a cylindrical tube main body 1 and seal layer 2 made of a fiber-reinforced resin composed of continuous fibers wound in layers by filament winding as shown in FIG. 2. The pressure transducer according to the present example is not limited to a seawater desalination apparatus, and can also be used in an apparatus which uses another reverse osmosis membrane to extract solutions of different concentrations.

Specifically, in the tube main body 1, glass fibers impregnated with resins including epoxy resins and their curing agents are wound (helically) continuously in the necessary amount on a cylindrical mandrel at a predetermined angle α relative to the axial core direction of the mandrel (the axial core direction of the tube main body 1) by conventional filament winding, the epoxy resins are cured by heating, the mandrel is then removed, thereby forming a cylinder, and the resulting cylinder is used as the tube chamber (the tube body) of the pressure transducer described above. The resins are not limited to epoxy resins, and polyester resins, vinyl ester resins, and other resins may be used; and the fibers are not limited to glass fibers, and carbon fibers and other fibers may be used. The winding method is not limited to filament winding, and tape winding or sheet winding may be used.

In the present example, the aforementioned angle α is set to ±50° (+50° and −50° meaning that the length directions of the fibers include mutually orthogonal directions, but since they have the same angles relative to the core, they are included in a single angle in the present example) in order to ensure a predetermined tensile strength, and the tube main body 1 is formed by winding the continuous fibers at a single angle of ±50° relative to the axial core direction of the tube main body 1.

In the present example, the tube main body 1 has a single-layer structure in which the aforementioned angle α is set to ±50°, but the angle may be suitably adjusted within a range of ±50°±5°, and the tube main body 1 may have a multi-layered structure composed of an inside layer formed by winding the continuous fibers at a single angle of ±45°±5° relative to the axial core direction of the tube main body 1 and an outside layer formed by winding the continuous fibers at a single angle of ±85°±5° relative to the axial core direction of the tube main body 1. The configuration has excellent tensile strength in this case as well.

A seal layer 2 having a thickness of 0.5 mm or greater (preferably 1.5 mm or greater) is provided to the internal peripheral surface of the tube body. The thickness of the seal layer 2 is set to approximately 3 mm in the present example. This seal layer 2 is formed by tape winding. The internal peripheral surface of the tube body is smooth with substantially the same diameter due to this seal layer 2, the gap between the external periphery of the piston and the internal peripheral surface of the tube body is as small as possible when a piston is installed, and pressure can be transmitted satisfactorily when the seal layer 2 is used in a pressure transducer. The presence of the seal layer 2 also improves the internal peripheral surface strength and suppresses abrasion from the sliding of the piston as much as possible. In the present example, a case of a piston being installed was described above, but the present invention can also of course be applied to a tube body type which does not have a piston.

Figure 3:
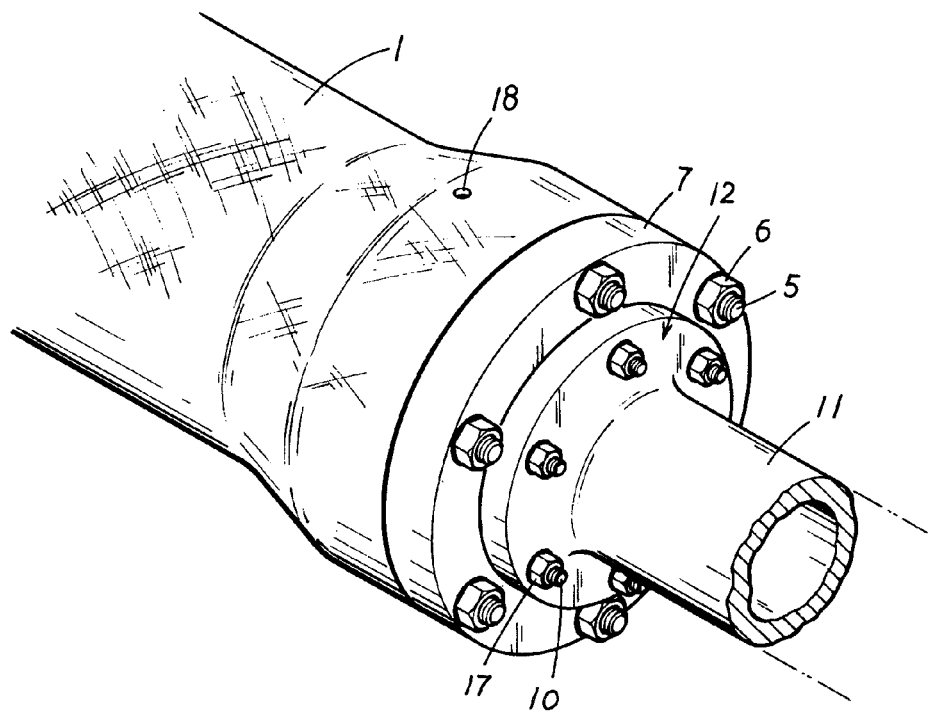
FIG. 3 is an enlarged schematic explanatory perspective view of the end part of the present example.
Figure 4:
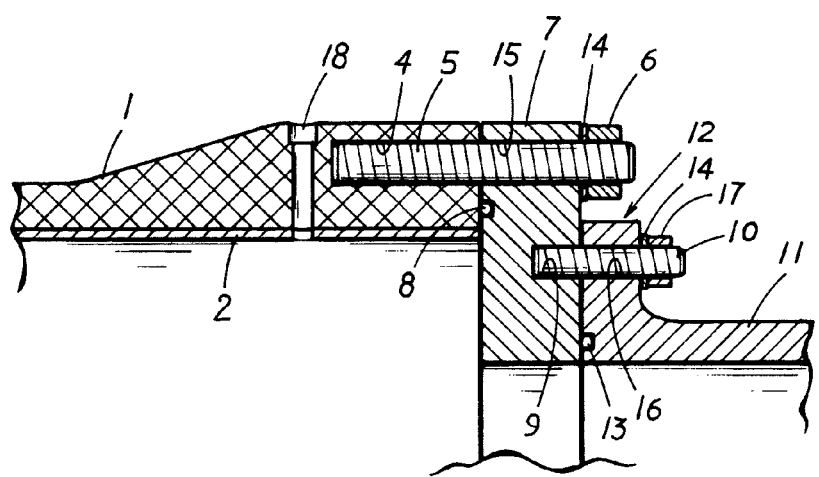
FIG. 4 is an enlarged schematic explanatory longitudinal sectional view of the end part of the present example.

Both ends of the tube body are provided with a sealing mechanism for sealing the tube body, as shown in FIGS. 3 and 4. Specifically, the sealing mechanism is configured from stud bolts 5 and nuts 6 threaded into screw holes 4 drilled into the thick parts formed at both ends of the tube body; a closing lid which is securely connected to the end surface of the tube body by the stud bolts 5 and nuts 6 and which is made of metal, FRP, PEEK (polyether ether ketone), PES (polyether sulfone), or FRTP (fiber-reinforced thermoplastics) in which these resins are reinforced by glass fibers; and an O ring 8 provided between the closing lid 7 and the end surface of the tube body. A metal closing lid 7 is used in the present example. The present example is also configured so as to be able to withstand pressures of 60 to 105 kg/cm$^2$ in the tube body during operation of the pressure transducer, due to the above-described winding direction of the fibers in the tube body as well as the sealing mechanism.

This sealing mechanism is provided with a joining mechanism for joining the closing lid 7 and another member. Specifically, the joining mechanism includes stud bolts 10 threaded into screw holes 9 drilled into the external surface of the closing lid 7, and is configured so that these stud bolts 10 and nuts 17 can be used to securely connect the flange 12 of a tube member 11 which has this flange 12 to the external surface of the closing lid 7. In the drawing, the symbol 13 is an O ring provided between the closing lid 7 and the flange 12 of the tube member 11, 14 is a washer, 15 is insertion holes through which stud bolts 5 are inserted, 16 is insertion holes through which the stud bolts 10 are inserted, and 18 is an aeration hole.

Figure 5:
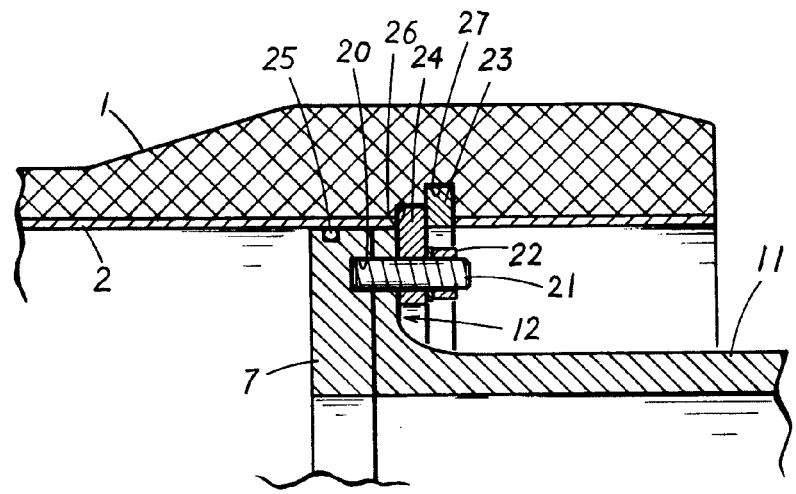
FIG. 5 is an enlarged schematic explanatory longitudinal sectional view of the end part of Additional Example 1.

The example shown in FIGS. 3 and 4 shows a case in which a sealing mechanism referred to as a so-called external coupler is used, but a sealing mechanism referred to as a so-called internal coupler as in Additional Example 1 may also be used as shown in FIG. 5. In this case, the closing lid 7 substantially equal in diameter to the internal peripheral surface of the tube body is closed up by being joined with a bolt 21 to a retainer ring 24 placed in a concavity 26 provided in the internal peripheral surface of the tube body, as shown in FIG. 5.

In the drawing, the symbol 22 is a nut threaded over the bolt 21, 23 is an inner ring which is placed in a concavity 27 provided in the internal peripheral surface of the tube body and which supports the retainer ring 24, and 25 is an O ring for closing up the space between the closing lid 7 and the internal peripheral surface (the seal layer 2) of the tube body. In FIG. 5, the tube member 11 is placed so that the flange 12 of the tube member 11 is clamped between the retainer ring 24 and the closing lid 7, and the configuration is designed so that the flange 12 of the tube member 11 and the closing lid 7 are both joined to the retainer ring 24 by the bolt 21. The inner ring is not a necessary member, and the inner ring 23 (and the concavity 27) may be left out depending on the extent to which the retainer ring 24 and the concavity 26 are engaged (the support strength).

Figure 6:
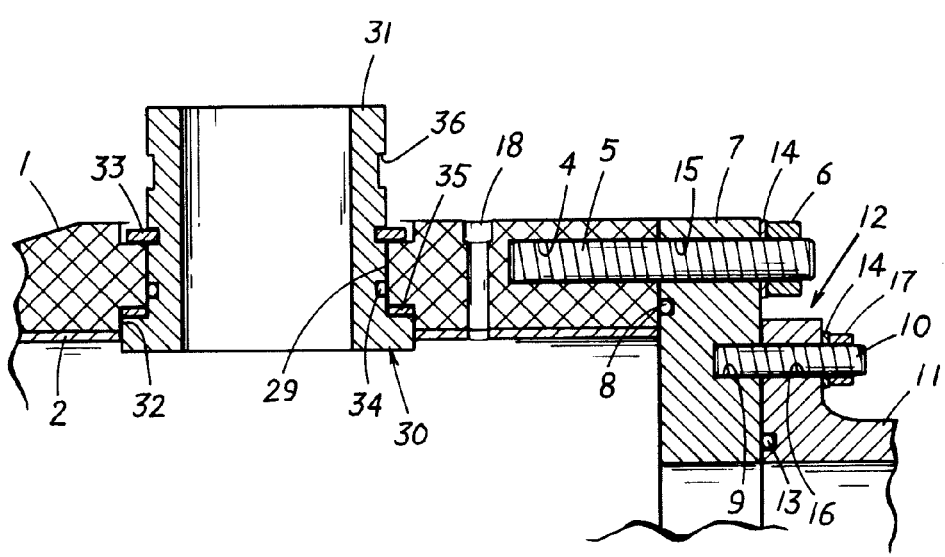
FIG. 6 is an enlarged schematic explanatory longitudinal sectional view of the end part of Additional Example 2.

The configuration may also have an inlet/outlet provided to the peripheral surface of the tube body for leading in or leading out fluid from this peripheral surface, and a joining mechanism provided to this inlet/outlet for joining the tube body and another member, as in Additional Example 2 shown in FIG. 6. In FIG. 6, the inlet/outlet has an in/out hole 29 drilled into the peripheral surface of the tube body and a cylinder body 31 provided to the in/out hole 29 and having a ridge 30 at one end, wherein the ridge 30 of the cylinder body 31 is interlocked with an interlocking groove 32 provided in the internal peripheral surface of the tube body. In the drawing, the symbol 33 is a snap ring for interlocking the cylinder body 31 with the external peripheral surface of the tube body, 34 is an O ring, 35 is a flat packing for sealing the space between the bottom of the interlocking groove 32 and the top surface of the ridge 30, and 36 is a joining interlocking groove in which a Victaulic joint or the like interlocks as a joining mechanism. In this case, a T-shaped valve (a breeches pipe) can be provided inside the tube body, which is more practical.

Figure 7:
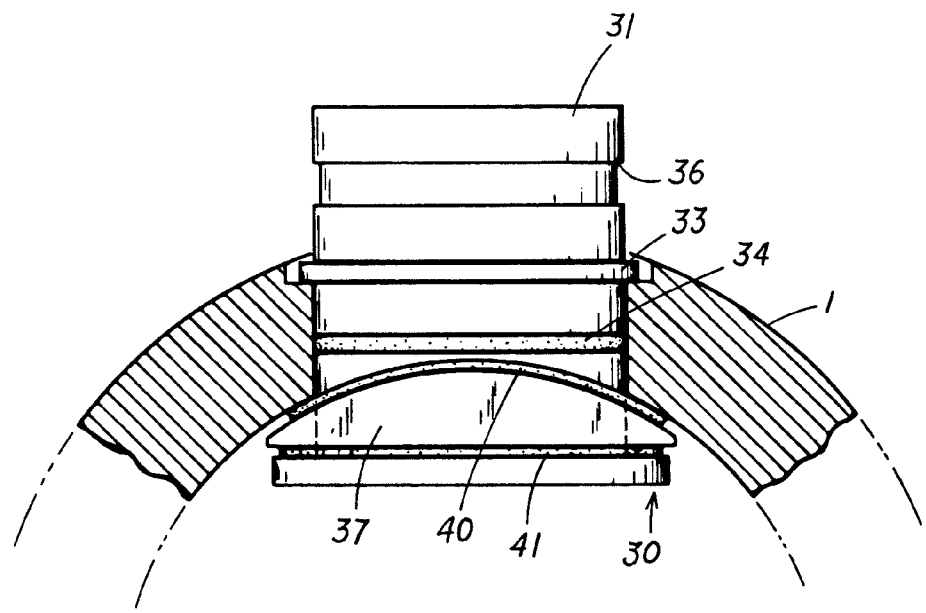
FIG. 7 is an enlarged schematic explanatory cross-sectional view of Additional Example 3.
Figure 8:
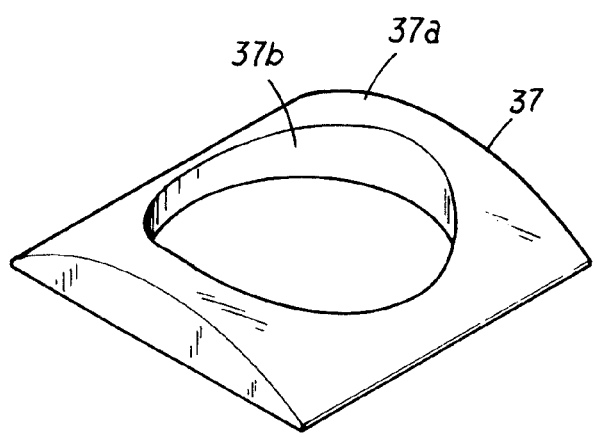
FIG. 8 is a schematic explanatory perspective view of the spacer of Additional Example 3.
Figure 9:
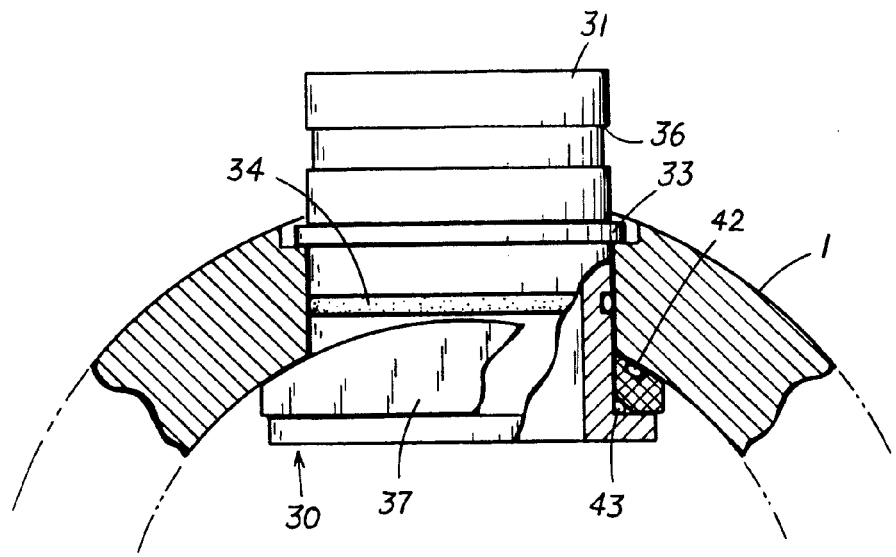
FIG. 9 is an enlarged schematic explanatory cross-sectional view of Additional Example 4.
Figure 10:
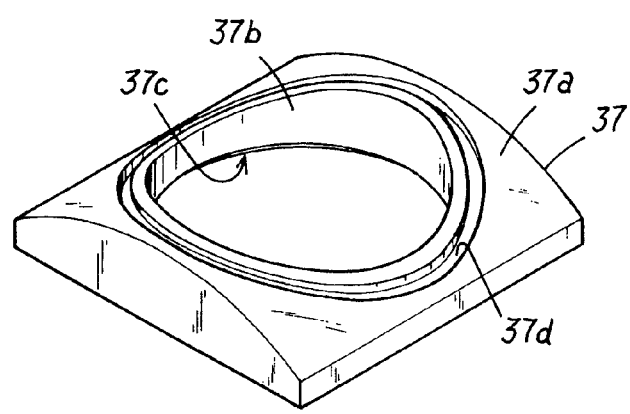
FIG. 10 is a schematic explanatory perspective view of the spacer of Additional Example 4.

The configuration is not limited to the cylinder body 31 interlocking with the interlocking groove 32 as in Additional Example 2 shown in FIG. 6. The interlocking groove 32 need not be formed, and a spacer 37 made of FRP may be provided between the ridge 30 of the cylinder body 31 and the internal peripheral surface of the tube body, the spacer 37 having a top surface shape conforming along the curved shape of this internal peripheral surface, as in Additional Example 3 shown in FIGS. 7 and 8 and Additional Example 4 shown in FIGS. 9 and 10. This spacer 37 has a so-called barrel-vaulted shape in which the top surface 37a thereof has a convex curvature so as to conform along the concave curvature of the internal peripheral surface of the tube body, and the center has an insertion hole 37b through which the trunk of the cylinder body 31 is inserted. Additional Example 3 shown in FIGS. 7 and 8 is an example in which flat packings 40, 41 are used as sealing members provided between the spacer 37 and both the internal peripheral surface of the tube body and the ridge 30 of the cylinder body 31, and Additional Example 4 shown in FIGS. 9 and 10 is an example in which O rings 42, 43 are used as the sealing member. In Additional Example 4, the bottom end opening peripheral edge 37c of the insertion hole 37b of the spacer 37 is chamfered while an O ring placement groove 37d is formed in the top surface 37a of the spacer 37, and O rings are placed in both the chamfered portion of the bottom end opening peripheral edge 37c and the O ring placement groove 37d. In Additional Examples 3 and 4, the cylinder body 31 can be restrained by the ridge 30 without the need to form an interlocking groove 32 in the internal peripheral surface of the tube body, and the tube body can be thinned accordingly.

The winding angle (a helical angle) of the continuous fibers of the tube body according to the present example is set to ±50° as described above, but upon closing up both ends of a tube body 7500 mm in length with the same structure as described above, repeatedly applying a pressure of 6.9 MPa (the same pressure as the pressure exerted when the structure is used as a tube body of a pressure transducer) 100,000 times, and measuring the amount of elongation in the length direction of the tube body before and after this pressure application, the amount of elongation was 0.96 mm before the pressure application and 0.98 mm after the pressure application. Therefore, it was successfully confirmed that the amount of elongation hardly changed even after 100,000 repeated pressure applications, the structure was extremely resistant to elongation, and even areas subjected to repeated pressure could be used stably for a long period of time. The reason for this is believed to be that due to optimizing the helical angle, the fibers are arranged properly relative to the pressure exerted in the length direction of the tube. It was confirmed that the same effects where achieved when the tube body had a multi-layered structure composed of an inside layer formed by winding the continuous fibers at an angle of ±45°±5° relative to the axial core direction of the tube body and an outside layer formed by winding the continuous fibers at an angle of ±85°±5° relative to the axial core direction of the tube body.

Figure 11:
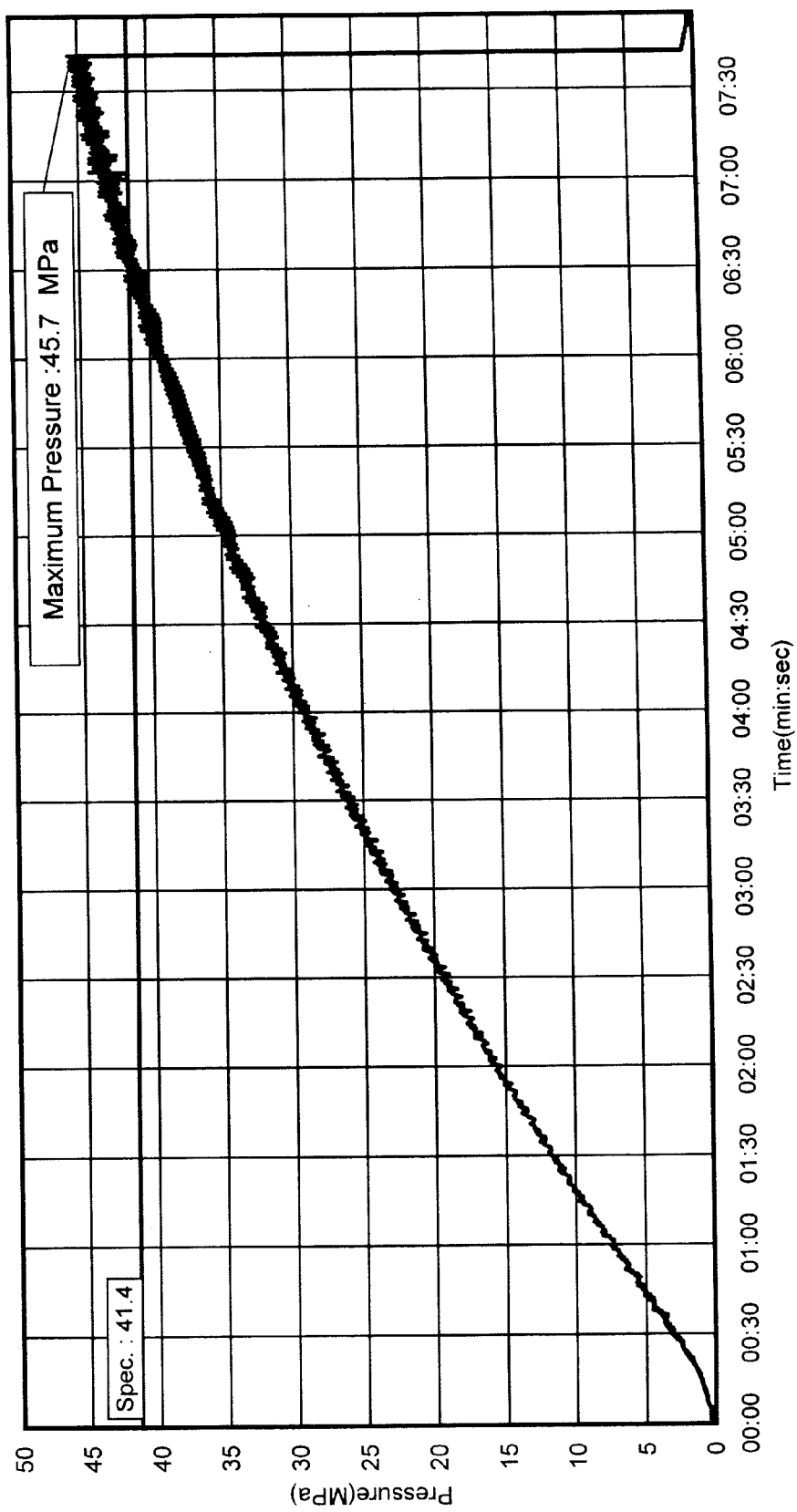
FIG. 11 is a graph showing the results of an internal pressure breaking test.

With the same structure as described above, both ends of a tube body 7500 mm in length were closed up after 100,000 repeated pressure applications at 6.9 MPa, the applied pressure was gradually increased, and the burst pressure was measured, upon which the pressure was 45.7 MPa, exceeding the reference value 41.4 MPa which was six times 6.9 MPa as shown in FIG. 11, and it was successfully confirmed that the pressure resistance was sufficient.

Because the present example is configured as described above, the present example has very excellent pressure resistance, corrosion resistance, and tensile strength, and can be manufactured at lower cost than stainless steel. Therefore, the present example can be used in a stable manner for a long period of time and has excellent cost properties even when used in a pressure transducer requiring extremely high pressure resistance, corrosion resistance, and tensile strength.

Furthermore, the inside diameter precision is improved over (made higher than) that of a stainless steel tube body, the gap between the piston and the inside wall of the tube body can be made as small as possible, and more efficient pressure transmission is made possible. The configuration elongates less readily than a stainless steel tube body, the lengthwise elongation is not readily affected by temperature, the configuration has even better dimension stability, and the configuration can be used satisfactorily even in high temperatures.

Consequently, the present example is an extremely practical example which has excellent pressure resistance, corrosion resistance, and tensile strength; which can be manufactured at low cost in comparison with cases of using stainless steel; and which makes it possible to keep inside diameter precision high.

The invention claimed is:

1. A tube body for a pressure transducer provided to a seawater desalination apparatus in which pressure applied to the interior is varied periodically, the tube body for a pressure transducer wherein the tube body has a piston in an interior; the tube body has a tube main body made of a fiber-reinforced resin formed by winding continuous fibers into layers by filament winding and a seal layer made of a fiber-reinforced resin 0.5 mm or more in thickness formed by tape winding in the interior of said tube main body so that an internal peripheral surface is smooth and substantially uniform in diameter; said tube main body 1 contains said continuous fibers wound at an angle of 50°±5° relative to the axial core direction of the tube main body; the tube body is provided with a closed lid which is provided securely to an end surface of the tube body, which closes up the end of the tube body, and which has an opening; and another tube member communicated with said opening is joined by a bolt to the closed lid.

2. A tube body for a pressure transducer provided to a seawater desalination apparatus in which pressure applied to the interior is varied periodically, the tube body for a pressure transducer, wherein the tube body has a piston in an interior; the tube body has a tube main body made of a fiber-reinforced resin formed by winding continuous fibers into layers by filament winding and a seal layer made of a fiber-reinforced resin 0.5 mm or more in thickness formed by tape winding in the interior of said tube main body so that an internal peripheral surface is smooth and substantially uniform in diameter; said tube main body contains said continuous fibers wound at an angle of 50°±5° relative to an axial core direction of the tube main body; the tube body is provided with a closed lid which is joined by a bolt to a retaining ring placed in a concavity provided to the internal peripheral surface of the tube body, which closes up an end of the tube body, and which has an opening; a flange of another tube member communicated with said opening is placed between the closed lid and the retaining ring;

and the flange is firmly joined between said closed lid and said retaining ring by said bolt.

3. The tube body for a pressure transducer according to claim 1, wherein a peripheral surface of the tube body is provided with an inlet/outlet for leading in or leading out fluid from the peripheral surface, and the inlet/outlet is provided with a joining mechanism for joining the tube body and another member.

4. The tube body for a pressure transducer according to claim 2, wherein a peripheral surface of the tube body is provided with an inlet/outlet for leading in or leading out fluid from the peripheral surface, and the inlet/outlet is provided with a joining mechanism for joining the tube body and another member.

5. The tube body for a pressure transducer according to claim 3, the fiber-reinforced resinous tube body wherein said inlet/outlet has an in/out hole drilled into the peripheral surface of said tube body and a cylinder body provided to the in/out hole and having a ridge at one end, wherein between the ridge of the cylinder body and the internal peripheral surface of said tube body, a spacer is provided having a top surface shape conforming along the curved shape of the internal peripheral surface.

6. The tube body for a pressure transducer according to claim 4, the fiber-reinforced resinous tube body wherein said inlet/outlet has an in/out hole drilled into the peripheral surface of said tube body and a cylinder body provided to the in/out hole and having a ridge at one end, wherein between the ridge of the cylinder body and the internal peripheral surface of said tube body, a spacer is provided having a top surface shape conforming along the curved shape of the internal peripheral surface.

7. The tube body for a pressure transducer according to any of claims 1 through 6, wherein the bursting strength of the tube body is 60 to 105 kg/cm2.

8. The tube body for a pressure transducer according to any of claims 1 through 6, wherein when a pressure of 6.9 MPa is repeatedly applied 100,000 times to the interior while both ends are closed up, the difference in the amount of lengthwise elongation before and after pressure application is 0.02 mm in a tube length of 7500 mm.

9. The tube body for a pressure transducer according to claim 8, wherein when a pressure of 6.9 MPa is repeatedly applied 100,000 times to the interior while both ends are closed up, the difference in the amount of lengthwise elongation before and after pressure application is 0.02 mm in a tube length of 7500 mm.

* * * * *